US009829225B2

(12) United States Patent
Schiehlen et al.

(10) Patent No.: US 9,829,225 B2
(45) Date of Patent: Nov. 28, 2017

(54) MODULE FOR A HEAT PUMP

(75) Inventors: Thomas Schiehlen, Altheim (DE); Steffen Thiele, Freital (DE); Thomas Wolff, Münchberg (DE); Eberhard Zwittig, Hochdorf (DE); Hans-Heinrich Angermann, Stuttgart (DE); Roland Burk, Stuttgart (DE); Holger Schroth, Maulbronn (DE); Stefan Felber, Schwieberdingen (DE); Steffen Brunner, Weissach im Tal (DE)

(73) Assignees: MAHLE Behr GmbH & Co. KG, Stuttgart (DE); MAHLE International GmbH, Stuttgart (DE)

(*) Notice: Subject to any disclaimer, the term of this patent is extended or adjusted under 35 U.S.C. 154(b) by 724 days.

(21) Appl. No.: 14/234,027

(22) PCT Filed: Jul. 19, 2012

(86) PCT No.: PCT/EP2012/064224
§ 371 (c)(1),
(2), (4) Date: Apr. 30, 2014

(87) PCT Pub. No.: WO2013/011102
PCT Pub. Date: Jan. 24, 2013

(65) Prior Publication Data
US 2014/0223955 A1 Aug. 14, 2014

(30) Foreign Application Priority Data
Jul. 21, 2011 (DE) ........................ 10 2011 079 586

(51) Int. Cl.
F25B 15/00 (2006.01)
F25B 30/04 (2006.01)
(Continued)

(52) U.S. Cl.
CPC .............. F25B 30/04 (2013.01); F25B 17/08 (2013.01); F25B 37/00 (2013.01); F25B 15/025 (2013.01);
(Continued)

(58) Field of Classification Search
CPC .......... F25B 30/04; F25B 17/08; F25B 37/00; F25B 39/026; F25B 2315/006; F25B 2315/002; F25B 15/025; F25B 35/04
See application file for complete search history.

(56) References Cited

U.S. PATENT DOCUMENTS 5,388,637 A   2/1995   Jones et al.
5,585,145 A   12/1996  Maier-Laxhuber et al.
(Continued)

FOREIGN PATENT DOCUMENTS

DE      44 05 669 A1      8/1995
DE   11 2004 000 878 T5   4/2006
(Continued)

OTHER PUBLICATIONS

International Search Report, PCT/EP2012/064224, dated Mar. 21, 2013, 5 pgs.
(Continued)

Primary Examiner — David Teitelbaum
(74) Attorney, Agent, or Firm — Muncy, Geissler, Olds & Lowe, P.C.

(57) ABSTRACT

The invention relates to a module for a heat pump, comprising an adsorption-desorption region, wherein in the region a bundle of pipes through which fluid can flow is arranged and a housing encloses the pipe bundle and a movable working medium in a sealing manner, wherein a supporting structure forms a mechanical support of a wall of the housing against the action of an external pressure.

23 Claims, 11 Drawing Sheets

(51) Int. Cl.
　　　*F25B 17/08*　　(2006.01)
　　　*F25B 37/00*　　(2006.01)
　　　*F25B 15/02*　　(2006.01)
　　　*F25B 35/04*　　(2006.01)
　　　*F25B 39/02*　　(2006.01)

(52) U.S. Cl.
　　　CPC ............ *F25B 35/04* (2013.01); *F25B 39/026* (2013.01); *F25B 2315/002* (2013.01); *F25B 2315/006* (2013.01); *F28F 2275/025* (2013.01); *Y02B 30/64* (2013.01)

(56) References Cited

U.S. PATENT DOCUMENTS

| | | | |
|---|---|---|---|
| 6,220,050 B1 * | 4/2001 | Cooksey | F04B 39/0061 62/503 |
| 6,973,963 B2 | 12/2005 | Dunne et al. | |
| 2005/0061023 A1 | 3/2005 | Ebbeson | |
| 2006/0101847 A1 * | 5/2006 | Henning | F25B 17/08 62/480 |
| 2008/0051279 A1 | 2/2008 | Klett et al. | |
| 2008/0078532 A1 * | 4/2008 | Nagashima | B22F 3/11 165/104.34 |
| 2008/0274345 A1 | 11/2008 | Fuesting et al. | |
| 2011/0005267 A1 * | 1/2011 | Lambert | B60H 1/32 62/476 |
| 2011/0048063 A1 * | 3/2011 | Carruthers | B01J 20/20 62/476 |
| 2012/0090345 A1 | 4/2012 | Angermann et al. | |

FOREIGN PATENT DOCUMENTS

| | | |
|---|---|---|
| DE | 10 2009 043 515 A1 | 4/2011 |
| JP | 10-185353 A | 7/1998 |
| JP | 2004-317011 A | 11/2004 |
| WO | WO 03/087682 A1 | 10/2003 |
| WO | WO 2006/097493 A2 | 9/2006 |
| WO | WO 2010/112433 A2 | 10/2010 |

OTHER PUBLICATIONS

German Search Report, DE 10 2011 079 586.3, dated May 10, 2012, 5 pgs.

* cited by examiner

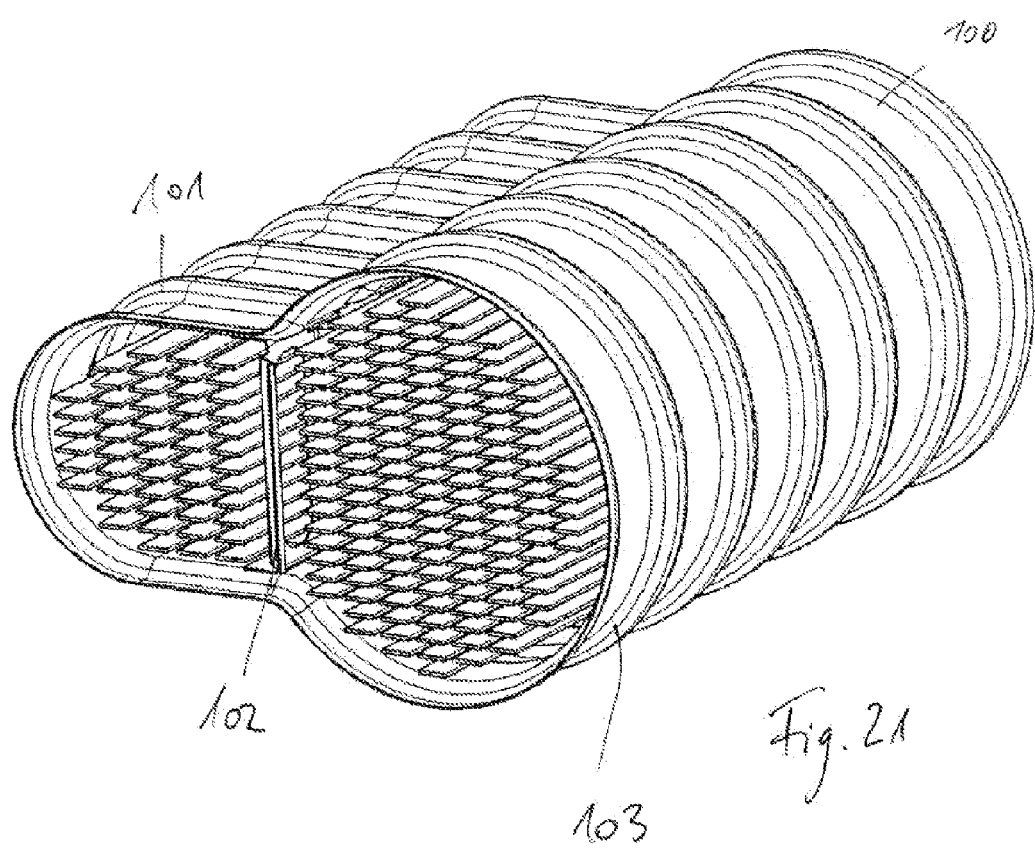

MODULE FOR A HEAT PUMP

CROSS-REFERENCE TO RELATED PATENT APPLICATIONS

This application is a National Stage of International Application No. PCT/EP2012/064224, filed Jul. 19, 2012, which is based upon and claims the benefit of priority from prior German Patent Application No. 10 2011 079 586.3, filed Jul. 21, 2011, the entire contents of all of which are incorporated herein by reference in their entirety.

The invention relates to a module for a heat pump in accordance with the preamble of claim 1.

WO 2010/112433 A2 describes a heat pump which has stacks of hollow elements in each of which an adsorption/desorption zone and a condensation/evaporation zone are arranged. The hollow elements are each filled with a working medium, which can be moved between the two regions. An adsorbent is applied to metal sheets, which have rim holes for the passage of tubes.

It is the object of the invention to specify a module for a heat pump which has a pressure resistant, in particular vacuum resistant, structure.

According to the invention, this object is achieved for a module mentioned at the outset by means of the characterizing features of claim 1. The provision of a supporting structure makes it possible by simple means to achieve improved pressure resistance of the housing, in particular to a relatively high external pressure.

A plurality of such modules can be combined to form a heat pump according to the invention, e.g. in accordance with the teaching of WO 2010/112433 A2.

In general, a reduced pressure relative to the surroundings prevails in such a module, at least under certain operating conditions, and this makes particular demands on the design of the housing. By means of the supporting structure, the externally acting pressure forces can be accepted and/or distributed in an effective manner.

A supporting structure of this kind can be formed as a trapezoidal sheet, for example, comprising longitudinal seams aligned transversely to longitudinal beads provided in a housing cover. In another embodiment in accordance with FIGS. 16 to 18, the trapezoidal sheet is dispensed with and replaced by two supporting elements, which support two housing half shells provided with transverse beads relative to one another. Alternative detail configurations of the supporting structure are possible, e.g. as a grid, a plurality of rods and the like.

In a preferred embodiment of the module, it comprises adsorber structures in the first region (adsorption/desorption zone), comprising at least one tube, through which a heat transfer fluid can flow, and an adsorbent, wherein the working medium can be adsorbed and desorbed on the adsorbent, and the adsorbent is thermally connected to the tube, wherein the adsorbent is designed as at least one shaped body, in particular a plurality of shaped bodies, which directly adjoins a tube wall of one of the tubes.

By means of the design of the adsorbent as a shaped body directly adjoining the tube wall, direct heat transfer from the fluid to the shaped body through the tube wall is achieved. This can furthermore simplify the structural design, save installation space and construction costs and increase effectiveness overall.

The concept of "directly adjoining" according to the invention should be taken to mean geometrically direct contact between the shaped bodies and the shape of the tubes. Depending on the detail design, there can be one or more further layers between a load bearing material of the tube walls and the shaped bodies, e.g. adhesive, heat conducting paste, solder and/or an anticorrosion layer on the tube wall.

A preferred, but not essential, working medium for adsorption and desorption is methanol. The adsorbent is advantageously based on activated carbon.

In an advantageous embodiment, the shaped body has a thickness of at least approximately 1 mm, preferably at least approximately 2 mm. Such relatively great thicknesses allow high effectiveness and optimization of the installation space. In this context, an upper limit for the thicknesses of the shaped body structures is advantageously about 10 mm and, particularly preferably, about 6 mm.

One possible embodiment of the invention envisages that the shaped body is connected to the tube wall by means of a preferably flexible adhesive layer. As a particularly preferred option, the adhesive layer is silicone-based, thereby achieving good flexibility with high heat resistance and chemical resistance at the same time. An example of a preferred adhesive based on silicone is ELASTOSIL® E43 or, as a particularly preferred option, 1K addition-cured Semicosil 988.

As a preferred but not essential option, the adhesive layer furthermore has additives to increase thermal conductivity. These can be boron nitride and/or finely ground graphite, expanded graphite and/or soot, for example. Metallic or ceramic particles are also possible.

The adhesive layer preferably has at least short-term temperature stability of about 250° C., thus allowing at least one-time complete desorption of the adsorber, in the course of initial installation for example. The adhesive layer has long-term resistance to the working medium, in particular methanol, up to at least about 130° C.

The adhesive layer is preferably chosen so as to have an elongation at tear or elongation at break of at least about 200%, preferably about 300%. Separation of the shaped bodies from the tube wall due to differential thermal expansion with relatively large temperature changes is thereby avoided.

In another embodiment of the invention, provision is made to reduce the thermomechanical stresses which arise in thermal cycling by means of predetermined breaking points introduced into the shaped adsorber bodies. As a result, it is even possible to use less flexible types of adhesive and/or very thin adhesive layers, which can compensate only relatively small differences in thermal expansion. It is, of course, also possible to bring about the breaks before a module begins to operate. In addition to the direct mitigation of thermomechanical stresses, this opens up further diffusion paths for the working medium into and out of the adsorbent (see below).

In another possible embodiment of the invention, it is envisaged that at least one of a plurality of shaped bodies rests against the tube wall of the tube under the action of a force, in particular in frictional engagement. In this case, there is no positive fixing or adhesive bonding, thus allowing for optimum compensation of differences in thermal expansion. Retention under the action of force leads to a defined, even more direct and therefore greater heat transfer.

In a preferred detail design, at least one of the two, namely the tube or the shaped body, has a substantially wedge-shaped cross section, wherein, in particular, at least one of the two is held under the action of a force in a wedging direction. Here, shallow wedge angles of a few degrees are preferably chosen.

In principle, an adsorber structure according to the invention can comprise both shaped bodies that are held by material engagement and also shaped bodies that are held by purely nonpositive engagement.

In a generally advantageous embodiment, the tube is designed as a flat tube or box section tube, wherein the shaped body preferably adjoins broad sides of the flat or box section tube. Flat tubes are simple and economical to produce and have large areas for heat transfer. In principle, any known design of flat tube can be considered for use, e.g. welded and/or soldered tubes, hydroformed tubes, tubes with a flanged butt weld, snap over tubes and/or B-type tubes.

In another advantageous embodiment, the tube is designed substantially as a round tube or polygonal tube, wherein the tube is embedded in two or more shaped bodies. Such a design allows substantially dense stacking in two directions in space, this being particularly conducive to the utilization of the installation space. In a preferred detail design, the shaped bodies in which the tube is embedded have a polygonal, in particular hexagonal, external outline overall, thus making it possible to achieve substantially geometrically dense stacking.

In a possible detail design, the shaped bodies are of substantially plate-shaped design, wherein they have in each case a plurality of indentations for partially surrounding some of the tubes. In this way, good utilization of space can be achieved with a small number of individual parts.

In a generally advantageous way, the shaped body has a recess which at least partially forms a steam duct for the adsorbent and/or a predetermined breaking point of the shaped body. Thus, effective supply and discharge of the working medium through the ducts is provided, even in the case of a spatially dense arrangement of adjoining shaped bodies. The alternative or supplementary function as a predetermined breaking point allows defined breaking, e.g. due to locally excessive thermal expansion. At the same time, the mechanical and thermal integrity of the overall structure, in particular the thermal contact between the tube and the adsorbent, is maintained. Through the formation of defined cracks parallel to the direction of heat conduction, the access area of the working medium and the kinetics of mass transfer are improved.

In a generally advantageous way, the tube is composed substantially of an iron-based alloy. Such alloys are particularly robust with respect to many working media, especially methanol.

In a preferred detail design, the tube is composed of a ferritic stainless steel (low coefficient of thermal expansion), e.g. 1.4509, 1.4512 etc. and/or a tinplated stainless steel. It can also be composed of a standard tinplated steel, e.g. of low-cost tinplate. Another variant is to use galvanized base material, in particular galvanized steel. It is also possible to use low-alloy steel or stainless steel, e.g. DC03, if contact corrosion and surface corrosion can be avoided (the latter by means of suitable corrosion inhibitors in the fluid).

In the case of design as flat tubes, the hydraulic diameter is preferably less than about 5 mm, preferably in a range between 1 mm and 2 mm.

The wall thicknesses of the flat tube are advantageously in a range of from 0.1 mm to 1 mm, preferably between 0.2 and 0.4 mm.

In the case of design as a round tube, said tube preferably has a diameter in a range between 4 mm and 6 mm. The round tube advantageously has wall thicknesses in a range between 0.05 mm and 0.5 mm and preferably between 0.1 mm and 0.3 mm. The round tube can be fitted with turbulence inserts for increasing the internal heat transfer coefficient.

In a particularly preferred embodiment of the module, the adsorber structures are designed as a mechanical support for the housing, leading to particularly high strength in respect of an external pressure. At the same time, a spatially particularly dense arrangement of the shaped bodies and tubes is achieved here.

The housing wall of the module is preferably composed of an iron-based alloy, e.g. steel, stainless steel, tinplated or galvanized steel or the like. In particular, the material can correspond to a material of the tubes. In the case of embodiments in steel, the housing can be painted on the outside or coated in some other way in order to prevent corrosion.

In a preferred detail design, there is in the evaporation/condensation region no support for the housing by the inner tubes and structures connected thereto for the accumulation and release of the working medium. Since this region is generally narrower than the adsorption region, this region can be bridged in a cantilevered manner by the housing with beaded- and/or trapezoidal sheet structures, and therefore needs no support on the sensitive inner evaporation/condensation structures present in this region. As a particularly preferred option, a supporting frame can be provided between the two regions in the interior of the housing in order to prevent excessive sagging of the housing in this region.

In a preferred module, the adsorption/desorption region occupies a larger proportion of the module than the evaporation/condensation region. As a particularly preferred option, the ratio of the volumes taken up by each of these regions within the housing is between about 1.5 or 1.7 and about 4.

If the module does not have a condensation/evaporation region, use as an adsorptive heat and/or cold reservoir or in a conventional adsorption heat pump concept comprising a plurality of adsorption reactors, with a common or separate condenser and evaporator, can be envisaged, for example.

A shaped body according to the invention having an adsorbent for a heat pump consists of a mixture comprising an adsorbent and a binder, which comprises a ceramic binder. The ceramic binder is based on a silicate, preferably but not necessarily on an aluminum silicate. Siliceous ceramics, e.g. magnesium silicates (e.g. steatite) and magnesium aluminum silicates (e.g. cordierite), are also possible.

The proportion of the ceramic binder by weight in the shaped body is between 5% and 50%, particularly preferably between 15% and 30%.

It is advantageous if the mixture contains a powder consisting of a sorption-active base material with a particle size in a range between 2 µm and 500 µm, preferably between 5 µm and 100 µm. The sorption-active base material can be activated carbon, for example.

The mixture can contain additives to improve heat conduction, e.g. expanded graphite and/or boron nitride and/or silicon carbide and/or aluminum nitride. The additives preferably account for between 5% and 50%, particularly preferably between 10% and 35%, of the mass.

As an alternative or supplementary measure, inorganic fibers can be added, improving thermal conductivity and/or mechanical stability.

In a preferred embodiment, activated carbon fibers can be added, and these can advantageously both include a heat conducting function and/or mechanical stabilization and perform an adsorption function.

A production method for the shaped body according to the invention can comprise extrusion and/or sintering, for example. Sintering can take place under inert gas.

Further advantages and features of the invention will emerge from the illustrative embodiments described below and from the dependent claims.

In the text which follows, a number of preferred illustrative embodiments of the invention are described and explained by means of the attached drawings.

Figure 16:
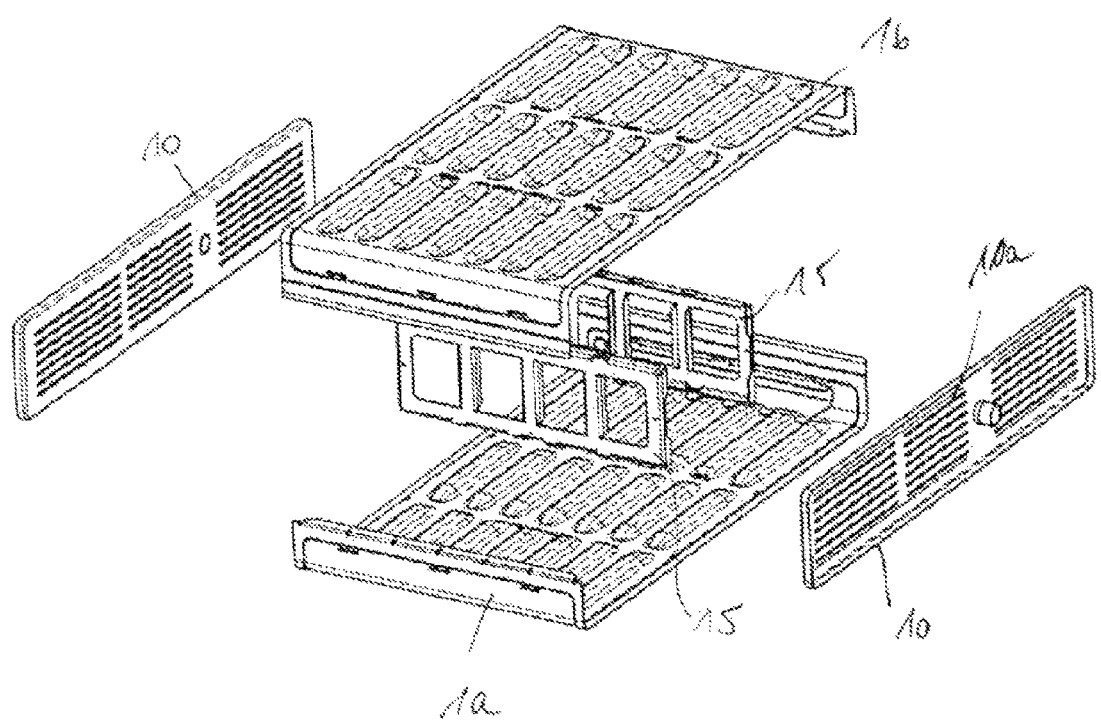
Figure 17:
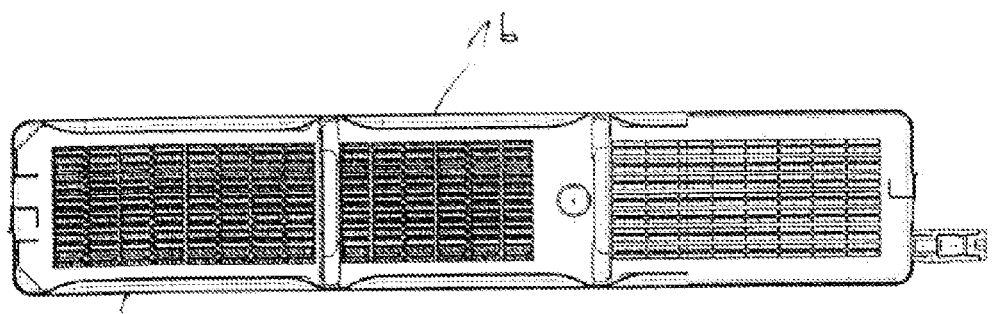
Figure 18:
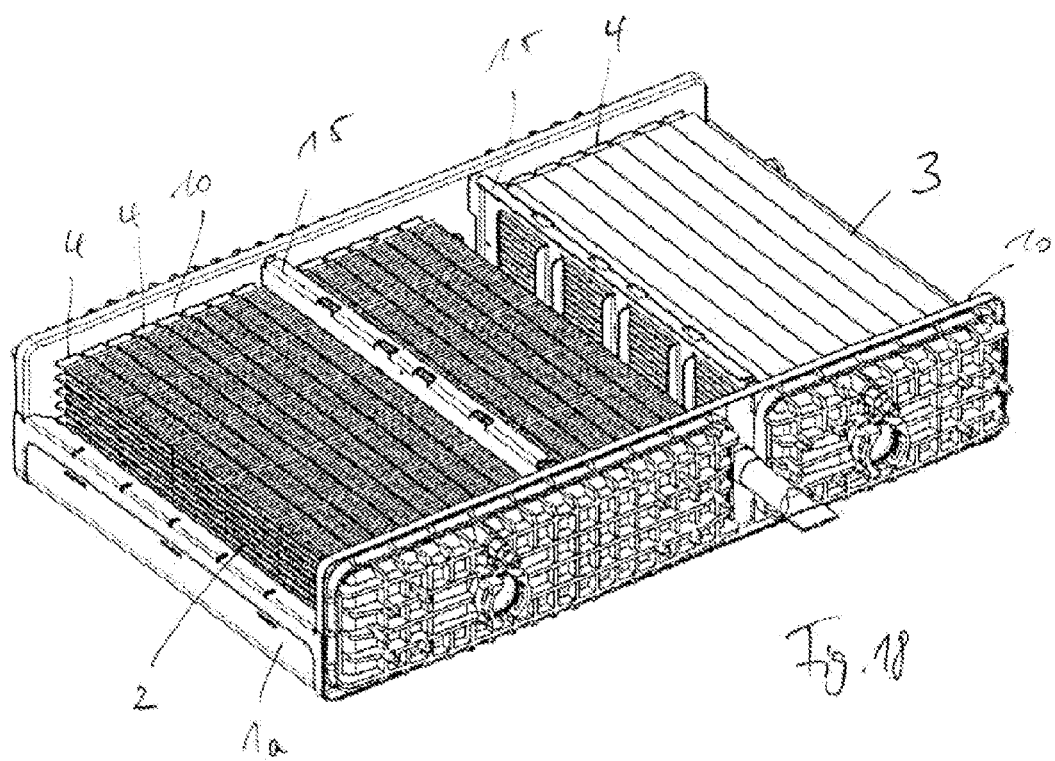
Figure 19:
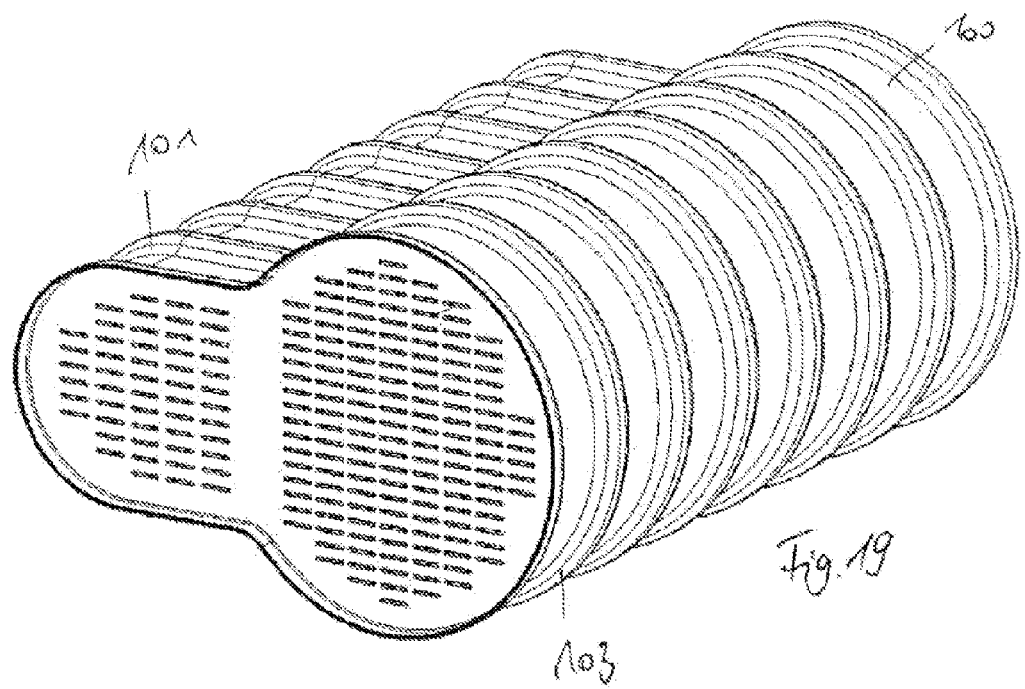
Figure 20:
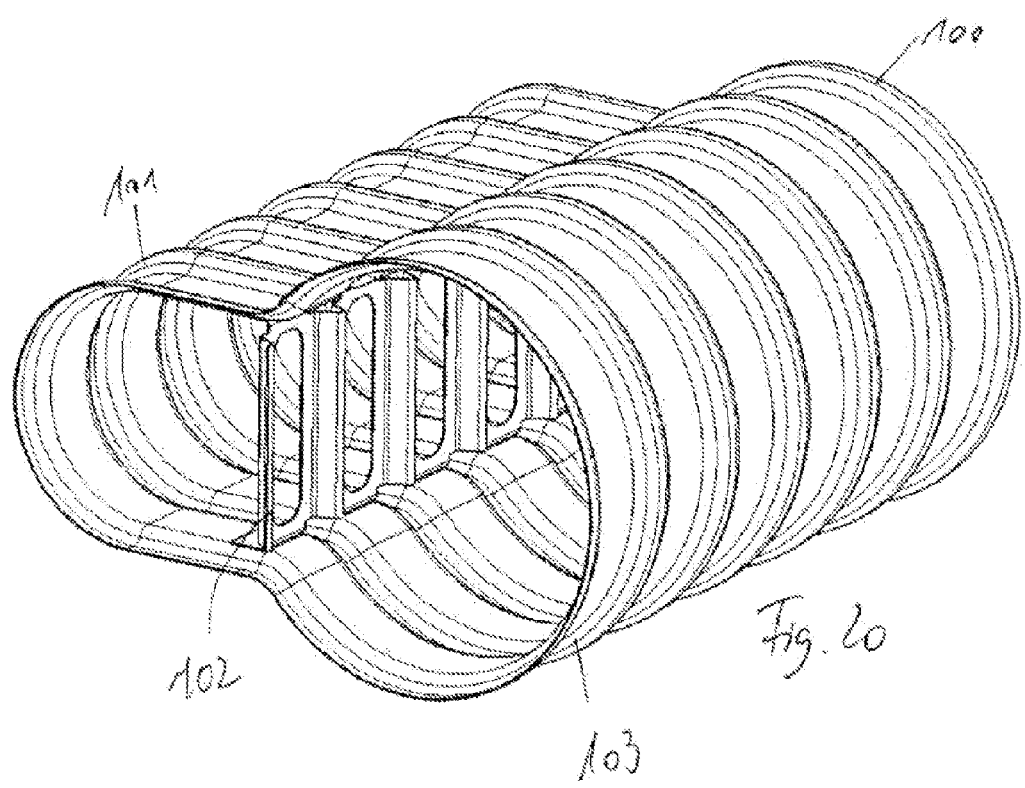

FIG. 16 shows an exploded drawing of the parts of an alternative housing concept FIG. 17 shows a modular construction having two supporting elements in cross section FIG. 18 shows the modular assembly having two supporting elements without the upper housing half shell FIG. 19 shows another alternative housing concept having a one-piece hydroformed housing FIG. 20 shows the internal construction of the one-piece hydroformed housing concept having a supporting element FIG. 21 shows the hydroformed housing concept (internal view with supporting frame and flat tubes)

Figure 1:
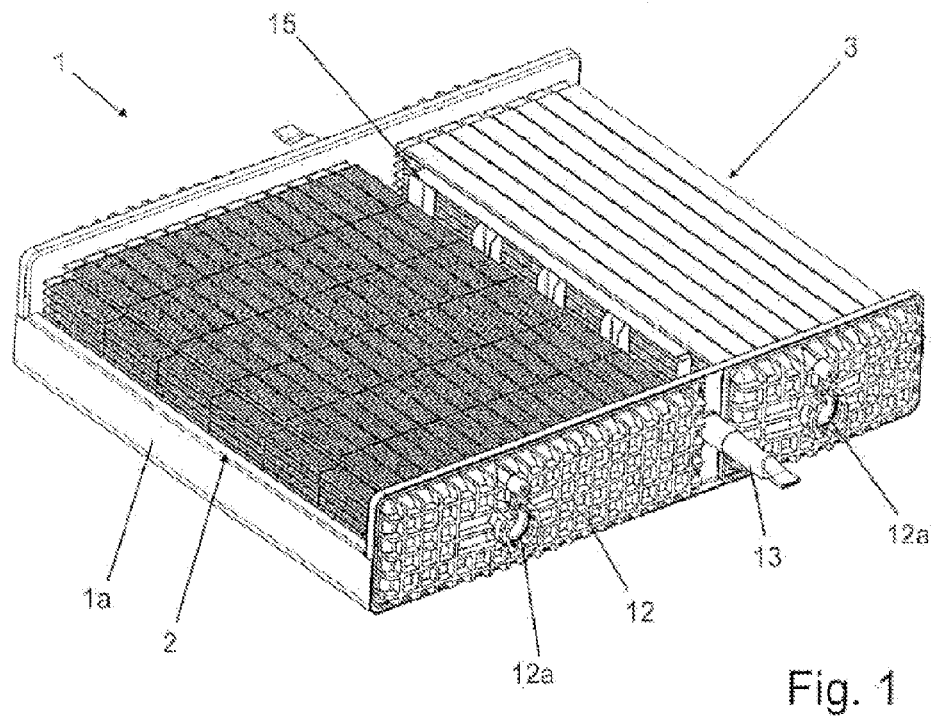
FIG. 1 shows a three-dimensional opened-up view of a module having adsorber structures according to the invention.
Figure 2:
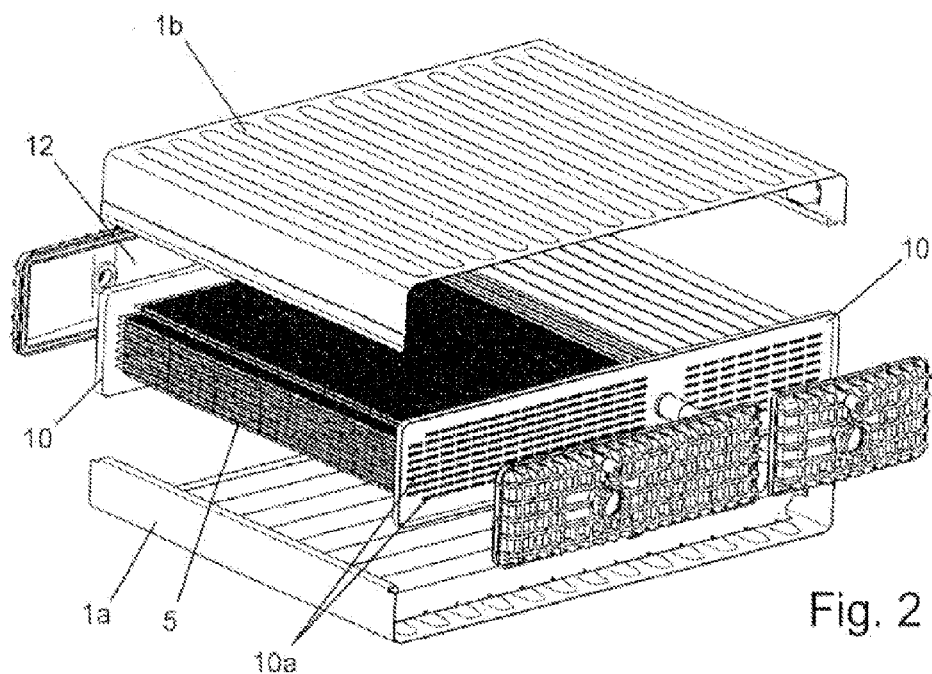
FIG. 2 shows the module from FIG. 1 in an exploded view.

The module shown in FIG. 1 is one of several combined modules of a heat pump. It comprises a housing 1, in which a first region as an adsorption/desorption region 2 and a second region as a condensation/evaporation region 3 are arranged adjacent to one another. Each of the regions 2, 3 comprises a plurality of tubes 4, in the present case flat tubes, which are arranged as a bundle stacked in two directions in space.

Figure 5:
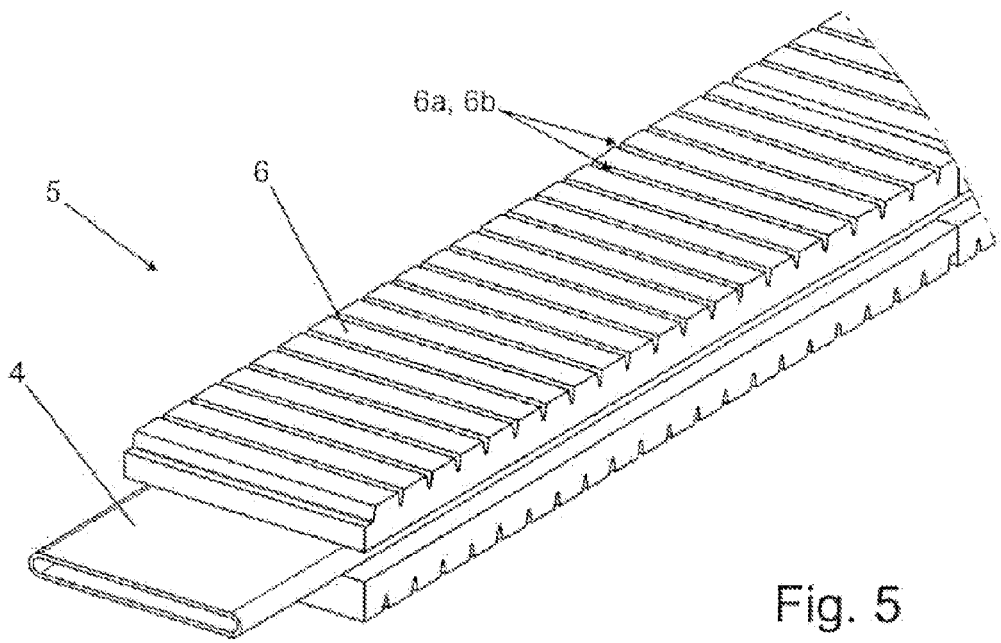
FIG. 5 shows a three-dimensional view of a first illustrative embodiment of an adsorber structure of the invention with retention by material engagement.
Figure 6:
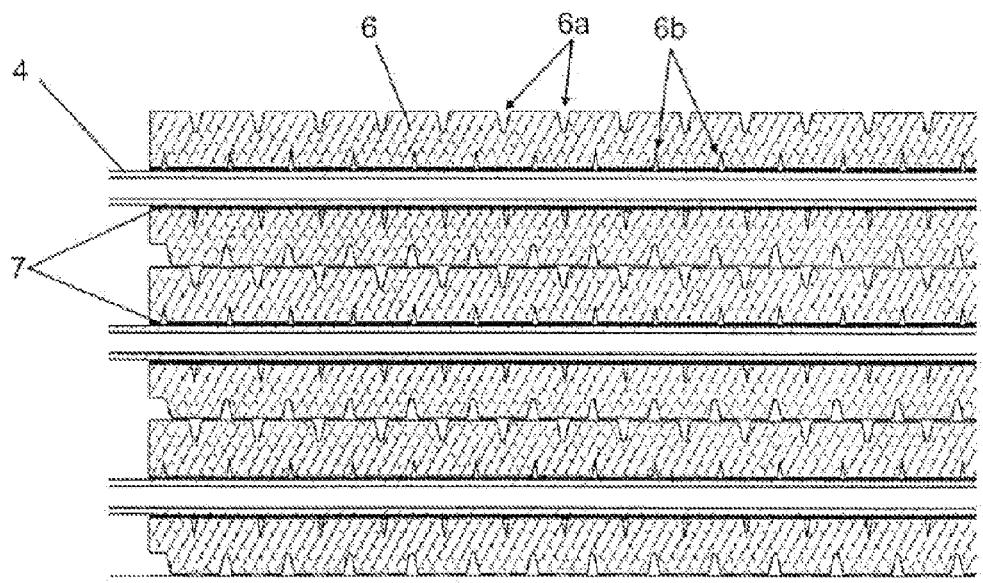
FIG. 6 shows a sectioned view through a stack arrangement of a plurality of adsorber structures from FIG. 5.
Figure 7:
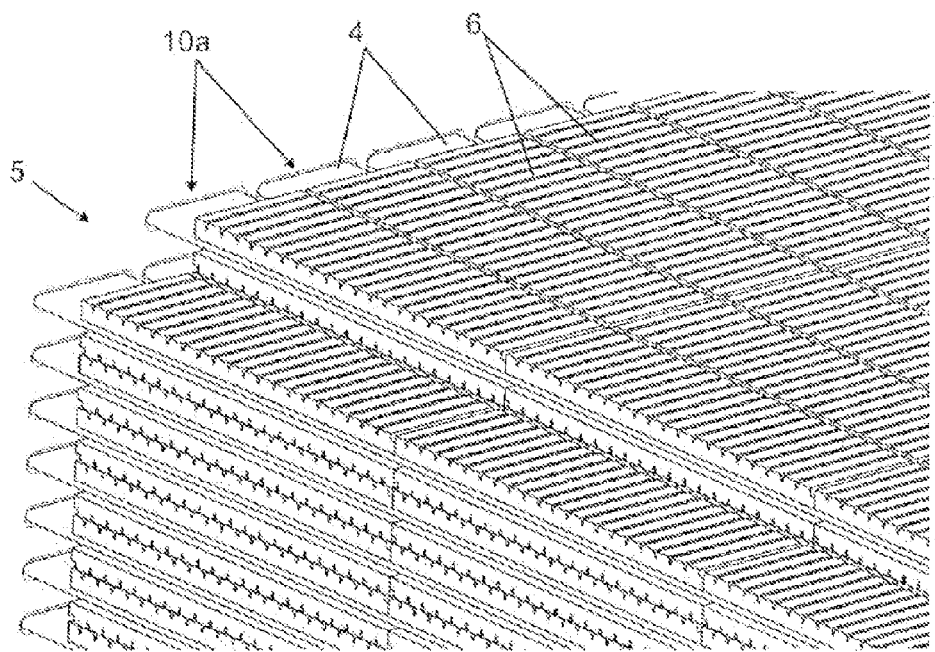
FIG. 7 shows a three-dimensional view of adsorber structures from FIG. 5, stacked in two directions in space.

Here, the tubes 4 of the first region are each designed as an adsorber structure 5 (see FIG. 5). In this case, the broad sides of the flat tubes 4 are each connected over an extended area to a shaped body 6, in the present case by adhesive bonding. The shaped body 6 is composed of a mixture of adsorbent, in the present case activated carbon, and binder.

An adhesive layer 7 for connecting the shaped bodies 6 to the tubes 4 comprises a flexible adhesive based on silicone, in the present case Semicosil 988.

Recesses 6a, 6b are formed in the shaped bodies, serving as steam ducts 6a for the joint supply and discharge of working medium and/or as predetermined breaking points 6b, by means of which separation of the shaped bodies from the tube 4 under excessive thermal stress is avoided.

The tubes 4 project beyond the shaped bodies 6 in end regions 4a and open into rim holes 10a in tube sheets 10. The latter are embodied in such a way that they can flexibly accommodate thermomechanical differences in expansion between the housing parts, on the one hand, and the tubes, on the other hand. For this purpose, the tubes can also have one or more annular beads surrounding the rim hole region of the tube bundles.

Figure 8:
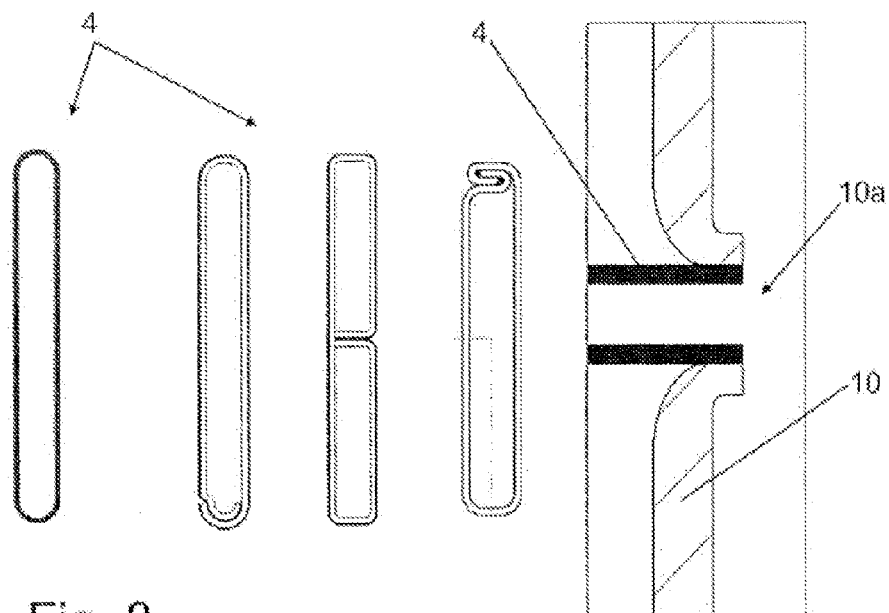
FIG. 8 shows section views of a number of designs of flat tubes of the adsorber structures from FIG. 5 to FIG. 7 and a section view of a flat tube inserted in a tube sheet.

The flat tubes 4 can be of any desired design, being designed as a longitudinally laser-welded tube, snap over tube, B-type tube or flanged tube according to FIG. 8 for example (from left to right).

Figure 9:
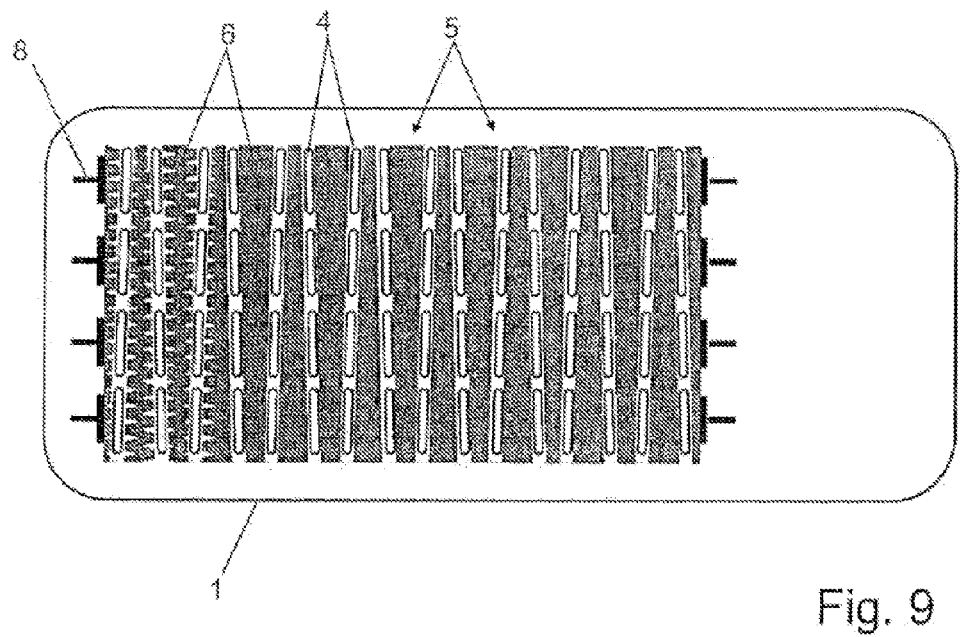
FIG. 9 shows a schematic sectioned view of another embodiment of adsorber structures with nonpositive retention.
Figure 10:
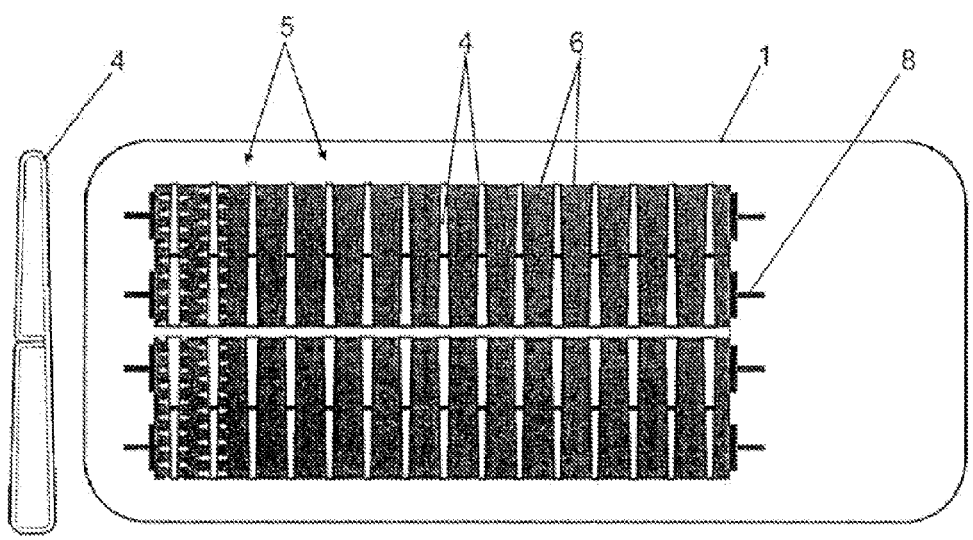
FIG. 10 shows a modification of the embodiment from FIG. 9 having wedge-shaped flat tubes.

FIG. 9 and FIG. 10 show embodiments having flat tubes 4, in which the shaped bodies 6 are not attached by adhesive bonding or material engagement but nonpositively, in the present case by frictional engagement.

In the example shown in FIG. 9, the shaped bodies are of slightly wedge-shaped design, and the flat tubes are of conventional design. Each shaped body 6 extends across a plurality of flat tubes 4 in a depth direction. In the longitudinal direction or stacking direction, the shaped bodies 6 alternate in orientation.

In the example shown in FIG. 10, both the shaped bodies 6 and the flat tubes 4 are slightly wedge-shaped. In this modification, each shaped body extends over one flat tube, with flat tube rows situated one behind the other in the depth direction being shown in reverse orientation. As a preferred option (not shown in FIG. 10), the shaped bodies project beyond the flat tubes in the depth direction, as also in FIG. 9, and therefore the shaped bodies are held in the wedging direction by support means or means subjected to an elastic force (not shown). Respective holding elements 8 are provided at each end in the stacking direction, said holding elements supporting at least the end-mounted shaped bodies under a static or elastic force in this direction. At least part of the supporting force in the stacking direction can also be taken by the tubes 4 accommodated in rim holes. As a further detail, the end-mounted support means for the tube bundle can also be braced against one another, e.g. by means of one or more straps.

Figure 11:
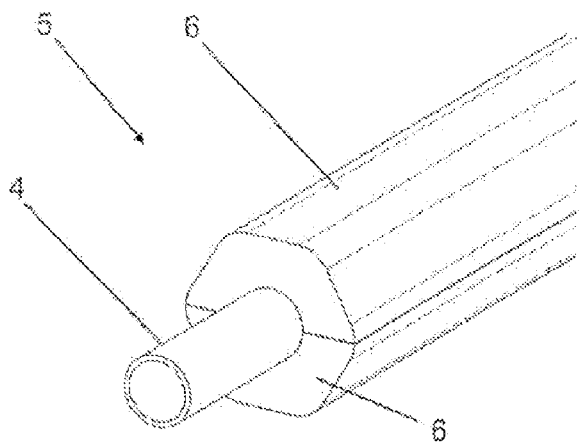
FIG. 11 shows a three-dimensional view of another example of an adsorber structure of the invention having a round tube.

In the illustrative embodiment shown in FIG. 11, flat tubes are replaced by round tubes 4, which can also be of polygonal design, depending on the particular modification.

The round tubes 4 are each surrounded partially by a plurality of shaped bodies 6, in the present case two shaped bodies. Overall, the tube 4 is completely embedded in the shaped bodies 6 (apart from tolerance or adhesive bonding gaps), and overall they have a hexagonal external outline in the present case. As a result, the adsorber structures 5, each consisting of one tube 4 and two shaped bodies 6, can be stacked densely in two directions in space (see FIG. 12).

The preferred thickness of the shaped bodies 6 is obtained from the average length of the heat conduction path, for which the same specifications apply in the case of all the shapes (preferably between 1 mm and 10 mm, particularly preferably between 2 mm and 6 mm).

As is apparent, the edges of the external outline of the shaped bodies have a defined rounding, and therefore respective steam ducts 6a are formed in the stack.

Additional steam ducts extending transversely to the longitudinal axis of the tubes can be formed by segmenting the shaped bodies in the longitudinal direction of the tubes and spacing the segments apart (not shown).

Figure 12:
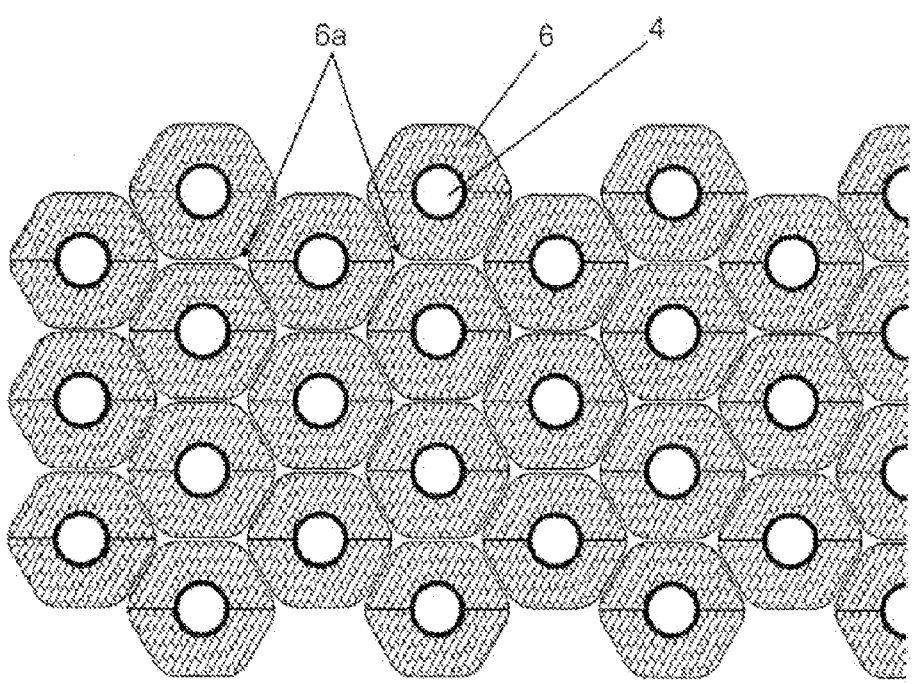
FIG. 12 shows stacking of adsorber structures according to FIG. 11 in two directions in space.

Depending on the requirements, the example shown in FIG. 11 and FIG. 12 can be designed with material and/or nonpositive attachment of the shaped bodies 6 to the tubes 4. With respect to the preferred material attachment, the same adhesive system can be used as that in the other illustrative embodiments.

Figure 13:
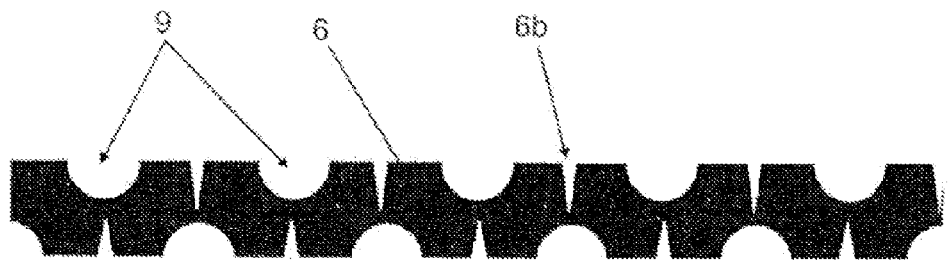
FIG. 13 shows a plate-shaped shaped body of another embodiment of an adsorber structure.
Figure 14:
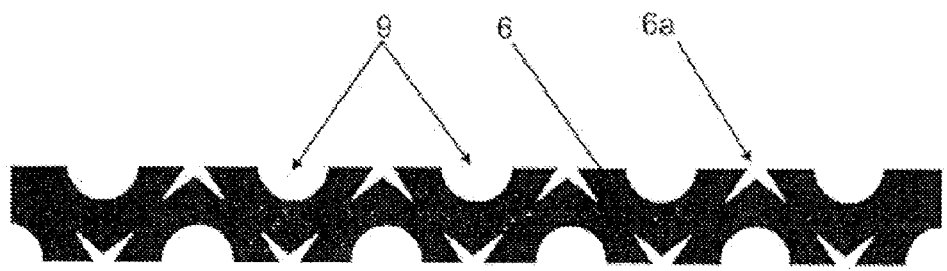
FIG. 14 shows a modification of the shaped body from FIG. 13.
Figure 15:
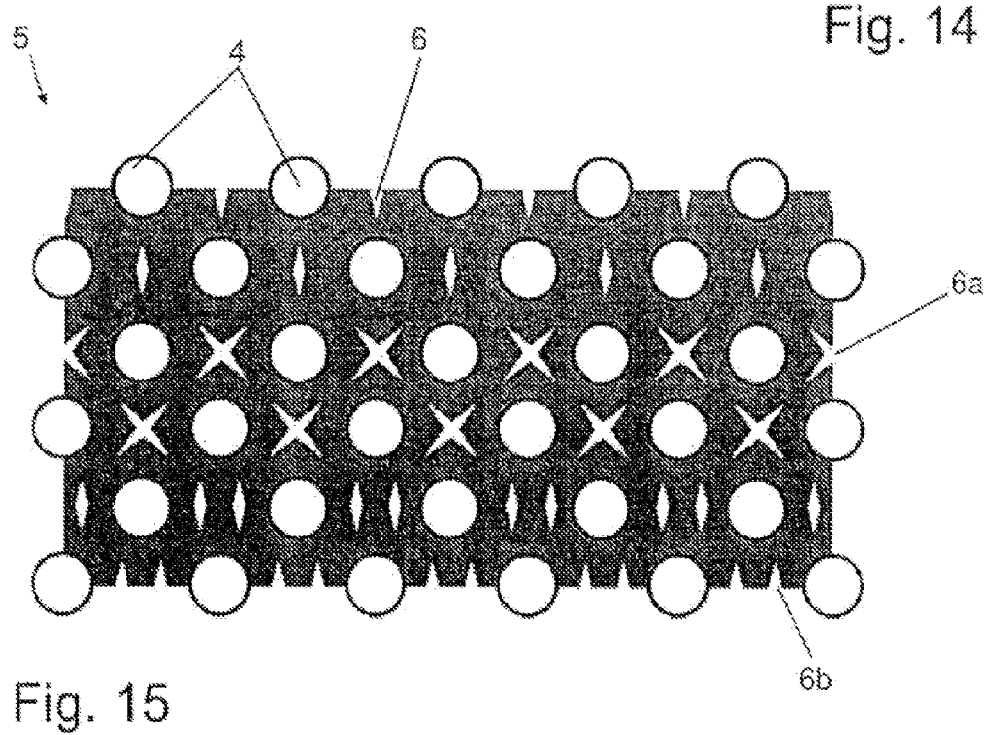
FIG. 15 shows an adsorber structure having round tubes and shaped bodies according to FIG. 13 and FIG. 14.

In the example shown in FIG. 13 to FIG. 15, the shaped bodies 6 are of substantially plate-shaped design, wherein each of the plates 6 has a plurality of indentations 9 for partially surrounding the tubes 4. In the present case, the tubes are round tubes, although this is not essential.

The shaped bodies 6 each have recesses 6a, 6b to form steam ducts and predetermined breaking points. It is self-evident that a recess 6a, 6b can also perform both functions simultaneously. They are preferably formed and arranged either in the neutral plane of the heat flux and/or as narrow gaps in the direction of heat flux.

Figure 3:
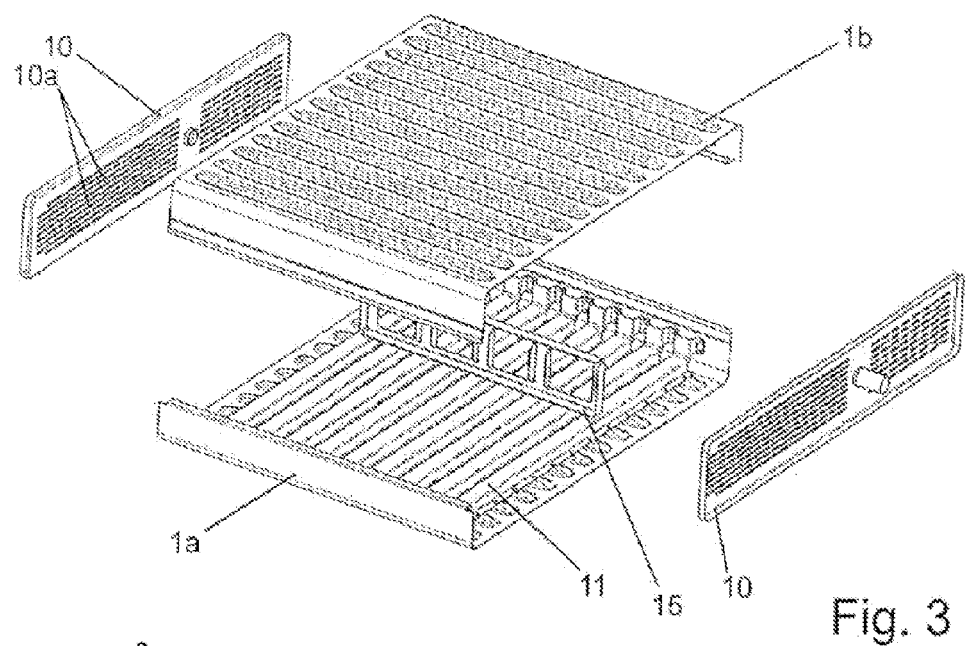
FIG. 3 shows an exploded view of housing parts of the module from FIG. 1.
Figure 4:
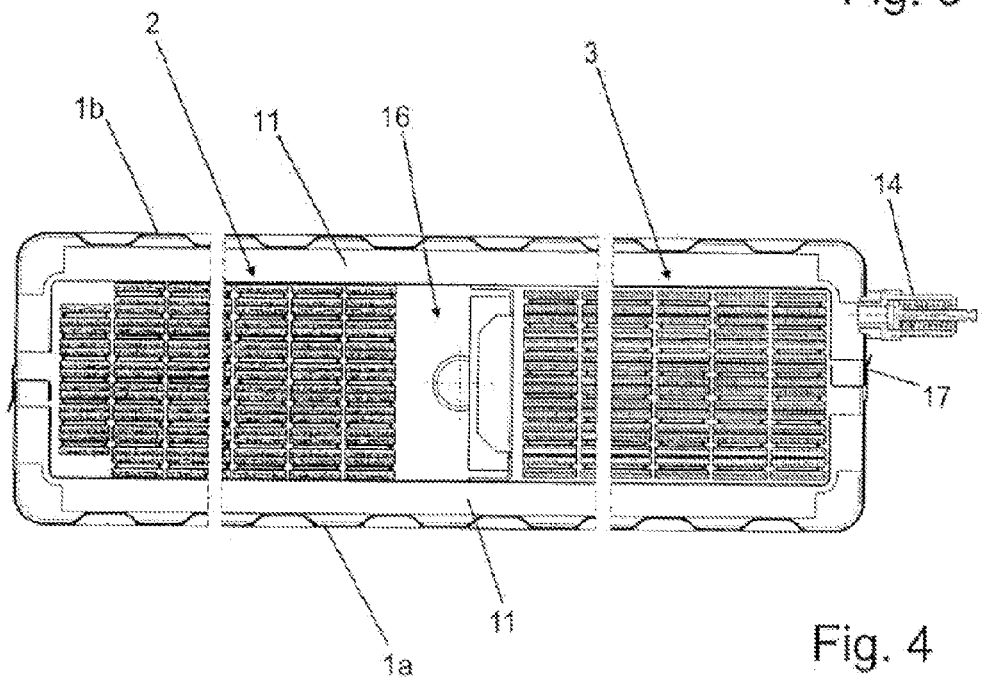
FIG. 4 shows a schematic sectional view through the module from FIG. 1.

FIG. 15 shows an adsorber structure 5 which comprises a stack of a plurality of the shaped bodies shown in FIG. 3 and FIG. 4 with rows of round tubes 4 arranged in between.

In general, the adsorber structures described above preferably have the following properties:

The tubes of the bundles are connected to the shaped bodies in a manner which allows good heat conduction, with overlaps of the ends being from 5 mm to 15 mm.

The tubes of the tube bundles are characterized by:

the base material being an iron-based material, particularly preferably ferritic stainless steel; this has a lower coefficient of thermal expansion than austenitic stainless steels.

As an alternative, tinplated stainless steel or tinplated steel (tinplate) can be used as a raw material—depending on the joining method chosen. Another variant is to use galvanized base material, in particular galvanized steel. Using noncorrosive working media on the inside of the module, such as methanol and heat transfer media containing corrosion inhibitors, also makes it possible to use inexpensive steels (structural steel). Moreover, said steels can also be additionally provided with corrosion protection on the outside by coating or painting only after the final material joining of the overall module.

The flat tubes 4 (FIG. 5 to FIG. 10) have a hydraulic diameter of <5 mm, preferably in a range between 1 and 2 mm. The wall thicknesses of the flat tubes are in a range of from 0.1 to 1 mm, preferably between 0.2 mm and 0.4 mm.

The round tubes (FIG. 11 to FIG. 15) preferably have a diameter in a range between 4 and 6 mm. The round tubes 4 have wall thicknesses in a range between 0.05 mm and 0.5 mm, preferably between 0.1 mm and 0.3 mm.

In particular, the shaped bodies of the illustrative embodiments described above preferably have features in accordance with the following examples or are preferably produced in the following manner:

EXAMPLE 1

1. Use of a highly porous adsorbent in powder form as an adsorption-active base material for adsorbing the selected working medium (in the present case methanol), having the following properties:
   1.1. Preferably having an adsorption isotherm of type 1.
2. Adsorber compound consisting of:
   2.1. Powder of the sorption-active base material with a particle size in a range between 2 µm and 500 µm, preferably between 5 µm and 100 µm.
   2.2. Ceramic binder based on siliceous ceramics such as magnesium silicates (e.g. steatite), magnesium aluminum silicates (e.g. cordierite) and aluminum silicates (e.g. stoneware, porcelain). The percentage by weight of the ceramic binder in the shaped body is between 5% and 50%, particularly preferably between 15% and 30%.
   2.3. Heat-conducting additives, especially expanded graphite, BN, SiC, AlN, the percentage by mass being between 5% and 50%, preferably 10% to 35%.
   2.4. Optionally inorganic fibers for reinforcement and increasing thermal conductivity.
   2.5. Optionally activated carbon fibers, which both have sorptive properties and can perform a heat conducting function.
3. Shaped bodies produced from adsorber compound by the following method:
   Version 1:
   3.1. Production of a plastic composition consisting of the components listed in 1., 2. above, plus water and a plasticizer.
   3.2. Extrusion, e.g. to give a film or a strand which is rolled to give a film, into which channels, grooves or blind holes are rolled, followed by cutting.
   3.3. Alternatively, extrusion to give a film with the profile already provided, having channels or grooves to improve mass transfer, followed by cutting into strips.
   3.4. Drying according to requirements, with measures to maintain the shape.
   3.5. Sintering in an inert gas atmosphere at a temperature and for a dwell time that are required for the hardening or sintering of the aluminum silicate binder to give a stable matrix.
   Version 2:
   Production of granules consisting of the components listed above and of an additive (e.g. a wax), which performs the function of a green binder after a pressing operation. One example of such a production process is the production of spray granules.
   3.6. Introduction of the granules into a mold and pressing to give the shape of the adsorber structure.
   3.7. Sintering in an inert gas atmosphere at a temperature and for a dwell time that are required for the hardening or sintering of the aluminum silicate binder to give a stable matrix.
   3.8. To establish a particular porosity and a defined pore structure, a pore former, e.g. in the form of powdered polymers or in the form of organic fibers, can optionally be added to the starting mixture.

The following features are preferably provided for the geometrical configuration of the shaped bodies:

A plate shape with a thickness in a range between 1 mm and 10 mm, preferably in a range between 2 and 6 mm.

A channel structure on one or both sides with a channel spacing that correlates with the plate thickness by a factor of between 0.5 and 2. A channel width is <1 mm, preferably <0.5 mm.

A channel depth which correlates with the plate thickness by a factor of between 0.2 and 0.8.

The following features are preferably present in respect of the adhesive layer 7 for attaching the shaped bodies 6 to tubes 4:

flexible adhesive layer characterized by:
full-surface wetting of the contact surface between the adsorption body and the metal support;
optional partial usage of the channel volume as an adhesive displacement volume for achieving thin adhesive layers;
temperature stability up to 250° C. for the purpose of adsorber desorption before installation;
long-term stability relative to the working medium, preferably methanol, up to 130° C.;
enrichment with heat conduction additives such as BN, finely ground graphite, expanded graphite or soot, depending on requirements;
elongation at tear (elongation at break) at room temperature is at least 300%
a layer thickness of the adhesive layer is between 10 μm and 500 μm, preferably between 50 μm and 150 μm.

The heat transfer fluid flowing through the tubes 4 is a matter of free choice, but is preferably a water/propylene glycol mixture.

The heat pump module shown in FIG. 1 to FIG. 4 preferably but not necessarily has, in a first region 2 thereof, adsorber structures in accordance with one of the illustrative embodiments described above. Any desired evaporation/condensation structures can be arranged in the second region 3, but preferably structures in accordance with EP 1 918 668 B1.

The housing 1 of the module comprises a lower housing part 1a and an upper housing part 1b, which each have stamped longitudinal beads in a first direction (direction of through flow) for reinforcement.

The housing 1 furthermore comprises the sheets 10 with the rim holes 10a, into which the tubes 4 are inserted. The edges of the sheets are surrounded in a hermetically sealed manner by the two housing parts 1a, 1b.

Respective supporting structures 11 are provided between housing parts 1a, 1b and the first and second regions 2, 3. The supporting structures 11 are of extended-area design, being designed in the present case as trapezoidal sheets (see, in particular, FIG. 2 and FIG. 3). Folds in the trapezoidal sheets 11 are oriented perpendicularly to the longitudinal beads of the housing parts 1a, 1b. The trapezoidal sheets rest on the inside of the housing parts 1a, 1b and are securely connected thereto by means of material joining methods, e.g. resistance spot welding.

Overall, the crisscrossing of the longitudinal beads and of the folds results in a high pressure stability of the housing walls, especially in respect of external excess pressure and good thermal decoupling between the internal structures and the housing parts.

The stacked adsorber structures 5 in the first region represent a further support. At least at operating temperatures and/or under a corresponding pressure effect (assembly with the minimum clearance necessary), the shaped bodies 6 rest perpendicularly one upon the other and on the trapezoidal sheets of the housing, resulting in optimum support with respect to the generally relatively high external pressure.

The sheets 10 are provided from the outside with plastic header tanks 12 of the kind which are known in principle from the construction of heat exchangers. The header tanks 12 have connections 12a for supplying and discharging heat transfer fluid.

Connections 13 for filling the module with working medium, in the present case methanol, are provided in the sheets 10. In the illustration in FIG. 4, one connection 14 is designed as a pressure relief valve with a valve plunger that can be actuated. Increased operating reliability and/or multiple filling of the module can thereby be achieved.

A supporting frame 15 is arranged in the module between the first region 2 and the second region 3 in order to further improve mechanical stability, especially in the vicinity of the second region 3. In general, in contrast to the adsorber structures 5 of the first region 2, no provision is made for the active structures for evaporation and condensation of the second region to rest upon one another in the manner of a mechanical support. This prevents condensed working medium from flowing down from the top between the structures.

Another particularly preferred further embodiment has the following differing features in accordance with FIGS. B1 to B3:

The direction of the housing beads of the two half shells is rotated through 90° and divided into three segments, between which there are undeformed flat housing surfaces.

In the region of the undeformed flat surfaces, the housing shells are supported internally by a total of two supporting frames, which have tabs which pass partially through the housing shells. These tabs are welded materially and in a hermetically sealed manner to the housing parts afterwards from the outside, the advantage being that this embodiment can absorb even relatively high excess pressures without damage.

The embodiment shown by way of example, having two supporting frames, in combination with the modified structure of the housing half shells, makes it possible to eliminate the trapezoidal sheets and hence to reduce the internal surface area and the mass of the housing.

The following features preferably apply to the construction of the module and, specifically, to the housing 1:

Both tube bundles of regions 2, 3 open at the ends into the tube sheets 10 and are connected materially thereto. The tube sheets have the following features:

A metal base material with low heat conduction, preferably austenitic stainless steel, such as 1.4301 or 1.4404. A thickness range of the tube sheet is between 0.3 mm and 1.5 mm, preferably between 0.5 and 1 mm. Depending on the tube production method and joining method used, tinplated or galvanized base materials or uncoated inexpensive steels can also be used.

Spacing of the tube sheet leadthroughs for thermal decoupling of the two regions 2, 3 in accordance with the thermal conductivity of the tube sheets is provided (adiabatic zone 16). As an alternative, however, the tube sheet can also be provided with a stamped transverse bead to reduce heat conduction losses between the regions.

The tube sheets 10 have integrally formed tube rim holes 10a and have an optional coating, which is matched to the type of tube used and to the fluidtight joining method implemented, e.g. a layer of tin in the case of joining by means of soft soldering.

A fluidtight tube/sheet connection can be produced by remote laser welding, characterized by:
  punching and push-through formation of a collar of the same height (FIG. 8);
  use of a longitudinally laser welded tube (FIG. 8);
  flanged butt welds at the ends in the heat conduction region.

As an alternative or supplementary measure, a fluidtight tube/sheet connection can be achieved by soft soldering, characterized by:
  use of one of the tubes illustrated in FIG. 8, preferably however a B-type tube, snap over tube, flanged tube or round tube;
  gap widths between 0 mm and 0.5 mm;
  use of either uncoated base materials and use of flux or use of coated base materials and omission of flux;
  in the case of the version involving uncoated base materials and the use of flux, steels that are not Ti-stabilized (Ti content only within the range of customary impurities) or, in particular, stainless steels should be used.
  joining by dip soldering, flow soldering, radiation soldering, hot gas soldering, inductive and/or furnace soldering of base materials precoated with solder. As an option, additional solder can be supplied in the form of solder foil, solder paste, solder wire and the like in accordance with the prior art for the purpose of gap filling.

As an alternative or supplementary measure, a fluidtight tube/sheet connection can be achieved by adhesive bonding, characterized by:
  use of flat tubes (FIG. 8), wedge-shaped flat tubes (FIG. 10) or round tubes (FIGS. 11 to 15);
  use of a suitable adhesive, preferably from the group comprising epoxy resin adhesives;
  bonding gap <0.2 mm.

The housing 1 of the hollow element is preferably characterized by:
  base material consisting of stainless steel, preferably austenitic;
  shell-type construction comprising two housing parts 1a, 1b having;
  longitudinal beads in the direction of the longitudinal axes of the tubes, running out toward the rim;
  flat rim for material, fluidtight connection to the tube sheets 10 by flanged butt welding, soft soldering and/or adhesive bonding;
  U-shaped seam on one of the longitudinal edges in each case (longitudinal edge reinforcement and splash guard during optional laser welding);

As a particularly preferred option, there is a reinforcement by a trapezoidal sheet 11 with a seam edge direction perpendicular to the external beading, characterized by:
  trapezium height adjusted for support of the inner trapezium surfaces on the adsorber structure;
  recesses for 90°-forming toward the side faces;
  spot welding to the outer shells;
  the housing half shells 1a, 1b are preferably connected to one another materially and hermetically by through-welding the upper and lower sheet by means of deep penetration laser welding,
  the sheet/housing connection is made by flanged butt welding;
  optional additional sealing is effected by means of a sealing adhesive in the bonding gap 17 (FIG. 4).

As an alternative to the fluidtight connection of parts by means of welding technologies, soft soldering and/or adhesive bonding can be used.

The supporting frame 15 is arranged in the region of the adiabatic zone 16 between the sorption zone 2 and the phase change zone 3 and is preferably characterized by:
  frame with bars angled in a U or L shape;
  frame height matched to the clear width between the inner surfaces of the trapezoidal sheet.

The connections 13, 14 for evacuation and filling preferably comprise stainless steel or copper stubs which are welded into the tube sheet by means of resistance welding and into which respective evacuation and filling tubes made of copper are soldered for pinching off, ultrasonic welding and/or soldering shut.

As an alternative, they can be stainless steel fittings which are screwed into the stubs and sealed off by means of metal gaskets and into which an evacuation/filling tube made of copper is soldered for pinching off and soldering shut or ultrasonic welding.

The header tanks 12 preferably comprise an injection molded plastic inner part substantially resistant to hydrolysis, preferably PA or PPS, having:
  an elastomer seal for sealing off with respect to the tube sheet;
  respective fluid connections;
  respective vent stubs;
  An optional contact pressure bell made of metal (not shown) can have:
  bell depth adjusted to provide support for the internal sealing plastic inner part;
  guides and supporting elements for straps;
  straps for pressing two opposite header tanks in each case against the tube sheets of the tube bundles for the sorption zone 2 and phase change zone 3;
  clamping bars with clamping screws for pressing two opposite header tanks on in each case.

FIGS. 16 to 18 show a module consisting of a plurality of combined modules of a heat pump. It comprises a housing 1 consisting of the upper housing half 1b and the lower housing half 1a, in which a first region as an adsorption/desorption region 2 and a second region as a condensation/evaporation region 3 are arranged adjacent to one another. In this case, the adsorption/desorption region 2 is divided into two submodules, which are divided by a supporting element 15. Each of the regions 2, 3 comprises a plurality of tubes 4, in the present case flat tubes, which are arranged as a bundle stacked in two directions in space.

In this case, the tubes 4 of the first region are each designed as an adsorber structure 5. Here, the broad sides of the flat tubes 4 are each connected to a shaped body 6 over an extended area, in particular by an adhesive bond for example. The shaped body 6 is composed of a mixture of adsorbent, in the present case activated carbon, and binder.

Recesses 6a, 6b are formed in the shaped bodies, serving as steam ducts 6a for the joint supply and discharge of working medium and/or as predetermined breaking points 6b, by means of which separation of the shaped bodies from the tube 4 under excessive thermal stress is avoided.

The tubes 4 project beyond the shaped bodies 6 in end regions 4a and open into rim holes 10a in tube sheets 10. The latter are embodied in such a way that they can flexibly accommodate thermomechanical differences in expansion between the housing parts, on the one hand, and the tubes, on the other hand. For this purpose, the tubes can also have one or more annular beads surrounding the rim hole region of the tube bundles.

The two supporting elements 15 are arranged parallel to the longitudinal extent of the tubes 4, which support two housing half shells 1a, 1b provided with transverse beads on one another. Alternative detail designs of the supporting structure are possible, e.g. as a grid, a plurality of rods and the like.

In another embodiment of the invention, in accordance with FIGS. 19 to 21, the housing consists of at least one housing region 100 in the form of a cylinder segment and of a second, smaller housing region 101 of any desired shape, which preferably forms a single hydroformed component. Here, the cylinder segment 100 preferably surrounds the larger sorption zone (adsorption/desorption zone) of the module in such a way that the region of transition to the second housing region 101 comes to lie in the adiabatic zone. In the present case, this region of transition is supported by a supporting frame 102 for absorbing the differential pressure forces between the interior and the exterior. Both housing regions 100, 101 are provided with beads 103 for shape stabilization. This supporting element 102 is preferably designed in such a way that it is connected materially, e.g. by welding, to the hydroformed housing in order to be able to absorb even differential pressure forces acting from the inside outward.

The invention claimed is:

1. A module for a heat pump, comprising:
   a housing;
   an adsorption/desorption region, wherein in the adsorption/desorption region, a bundle of tubes through which fluid can flow is arranged;
   a supporting structure that forms a mechanical support for a wall of the housing against an action of an external pressure;
   a first tube sheet having first rim holes that each retain a first end of respective tubes of the bundle of tubes; and
   a second tube sheet having second rim holes that each retain a second end of the respective tubes of the bundle of tubes,
   wherein the housing encloses the bundle of tubes and a movable working medium in a sealing manner, and
   wherein the supporting structure is arranged parallel to a longitudinal extent of the bundle of tubes, the longitudinal extent of the bundle of tubes being a direction from the first end of the respective tubes to the second end of the respective tubes, such that the supporting structure extends from the first tube sheet to the second tube sheet.

2. The module as claimed in claim 1, further comprising a condensation/evaporation region that is provided in the housing and in which the bundle of tubes through which the fluid can flow is arranged, wherein the working medium is movable between the adsorption/desorption region and the condensation/evaporation region.

3. The module as claimed in claim 2, wherein in the condensation/evaporation region, there is no support by the bundle of tubes for an accumulation and release of the working medium.

4. The module as claimed in claim 2, wherein the adsorption/desorption region occupies a larger proportion of the module than the condensation/evaporation region, and wherein a ratio of the volumes taken up by each of these regions within the housing is between 2 and 4.

5. The module as claimed in claim 2, wherein the supporting structure is positioned between the adsorption/desorption region and the condensation/evaporation region.

6. The module as claimed in claim 5, further comprising a second supporting structure, the second supporting structure being positioned in the adsorption/desorption region.

7. The module as claimed in claim 1, further comprising an adsorber structure comprising:
   an adsorbent, wherein the working medium can be adsorbed and desorbed on the adsorbent, and the adsorbent is thermally connected to at least one tube of the bundle of tubes in the adsorption/desorption region,
   wherein the adsorbent is formed as at least one shaped body which directly adjoins a tube wall of the at least one tube of the bundle of tubes.

8. The module as claimed in claim 7, wherein the at least one shaped body forms a mechanical support for a wall of the housing against the action of the external pressure.

9. The module as claimed in claim 7, wherein the at least one shaped body rests against the tube wall of the at least one tube of the bundle of tubes under the action of a force by frictional engagement.

10. The module as claimed in claim 9, wherein at least one of the two, namely the tube or the shaped body, has a substantially wedge-shaped cross section, wherein, in particular, at least one of the two is held under the action of a force in a wedging direction.

11. The module as claimed in claim 7, wherein the at least one tube of the bundle of tubes is designed as a flat tube and the at least one shaped body adjoins a broad side of the flat tube.

12. The module as claimed in claim 7, wherein the tube is designed substantially as a round tube or polygonal tube, wherein the tube is embedded in two or more shaped bodies.

13. The module as claimed in claim 7, wherein the flat tube is composed of an iron-based alloy which is coated for the purpose of joining and/or for corrosion resistance.

14. The module as claimed in claim 13, wherein the shaped bodies in which the tube is embedded have a polygonal, in particular hexagonal, external outline overall.

15. The module as claimed in claim 14, wherein the shaped bodies are adhesively bonded to the tubes by means of a thermoplastic adhesive, e.g. a silicone-based adhesive.

16. The module as claimed in claim 15, wherein the adhesive has a low density of uncrosslinked molecules.

17. The module as claimed in claim 13, wherein the shaped body is of substantially plate-shaped design, wherein it has in each case a plurality of indentations for partially surrounding some of the tubes.

18. The module as claimed in claim 1, wherein the housing wall is composed of an iron-based alloy, and wherein the housing wall is painted on the outside.

19. The module as claimed in claim 1, wherein no Ti-stabilized steels and/or stainless steels are used in assembling a tube/sheet and a sheet/housing joint by soft soldering.

20. The module as claimed in claim 1, wherein the housing is embodied as a single-shell housing formed by hydroforming.

21. The module as claimed in claim 7, wherein the at least one shaped body is a plate-shaped body.

22. A module for a heat pump, comprising:
   a housing;
   an adsorption/desorption region, wherein in the adsorption/desorption region, a bundle of tubes through which fluid can flow is arranged; and
   a supporting structure that forms a mechanical support for a wall of the housing against an action of an external pressure,
      wherein the housing encloses the bundle of tubes and a movable working medium in a sealing manner, and
      wherein the supporting structure is arranged parallel to a longitudinal extent of the bundle of tubes,
   the module further comprising an adsorber structure comprising:

an adsorbent, wherein the working medium can be adsorbed and desorbed on the adsorbent, and the adsorbent is thermally connected to at least one tube of the bundle of tubes in the adsorption/desorption region, wherein the adsorbent is formed as at least one shaped body which directly adjoins a tube wall of the at least one tube of the bundle of tubes, wherein the at least one shaped body is a plate-shaped body, and wherein an upper surface of the plate-shaped body has first recesses that form steam ducts and a lower surface of the plate-shaped body has second recesses that form predetermined breaking points.

23. A module for a heat pump, comprising:

a housing;

an adsorption/desorption region, wherein in the adsorption/desorption region, a bundle of tubes through which fluid can flow is arranged; and a supporting structure that forms a mechanical support for a wall of the housing against an action of an external pressure, wherein the housing encloses the bundle of tubes and a movable working medium in a sealing manner, and wherein the supporting structure is arranged parallel to a longitudinal extent of the bundle of tubes the module further comprising an adsorber structure comprising:

an adsorbent, wherein the working medium can be adsorbed and desorbed on the adsorbent, and the adsorbent is thermally connected to at least one tube of the bundle of tubes in the adsorption/desorption region, wherein the adsorbent is formed as at least one shaped body which directly adjoins a tube wall of the at least one tube of the bundle of tubes, wherein the adsorbent is formed as multiple shaped bodies, each of the multiple shaped bodies being a plate-shaped body, wherein the at least one tube of the bundle of tubes is designed as a flat tube, and wherein a first one of the plate-shaped bodies adjoins a first broad side of the flat tube and a second one of the plate-shaped bodies adjoins a second broad side of the flat tube.

* * * * *